April 27, 1965      G. L. PRESTON      3,180,480
LIVE ROLLER CONVEYOR
Filed July 29, 1963      2 Sheets-Sheet 1
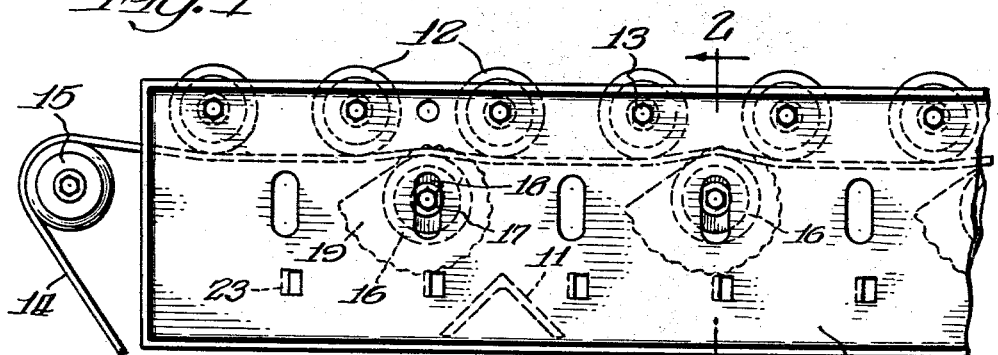
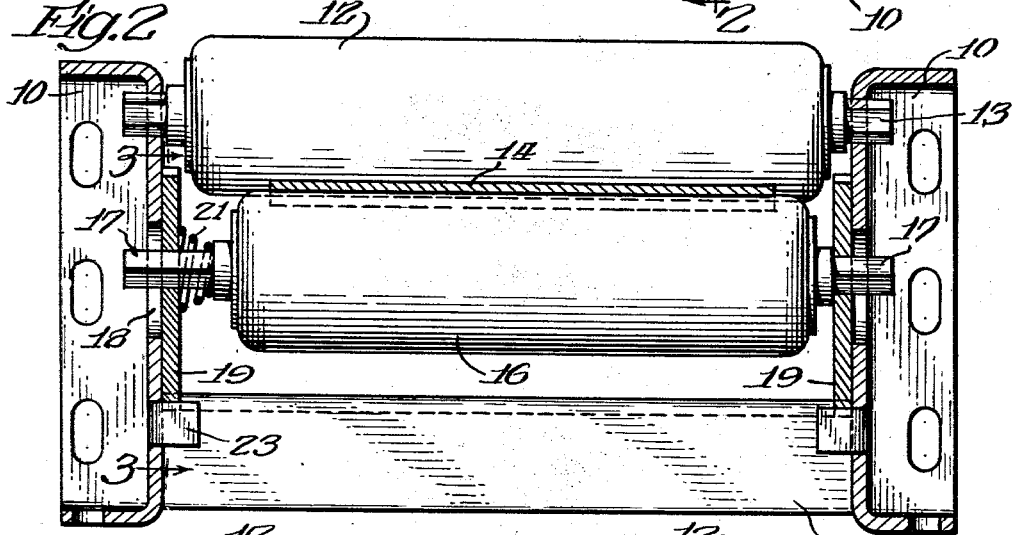
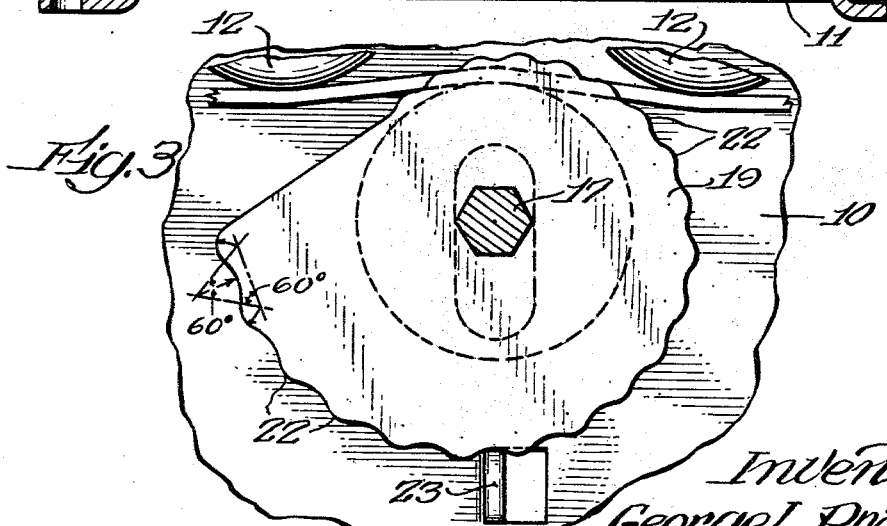
Inventor:
George L. Preston

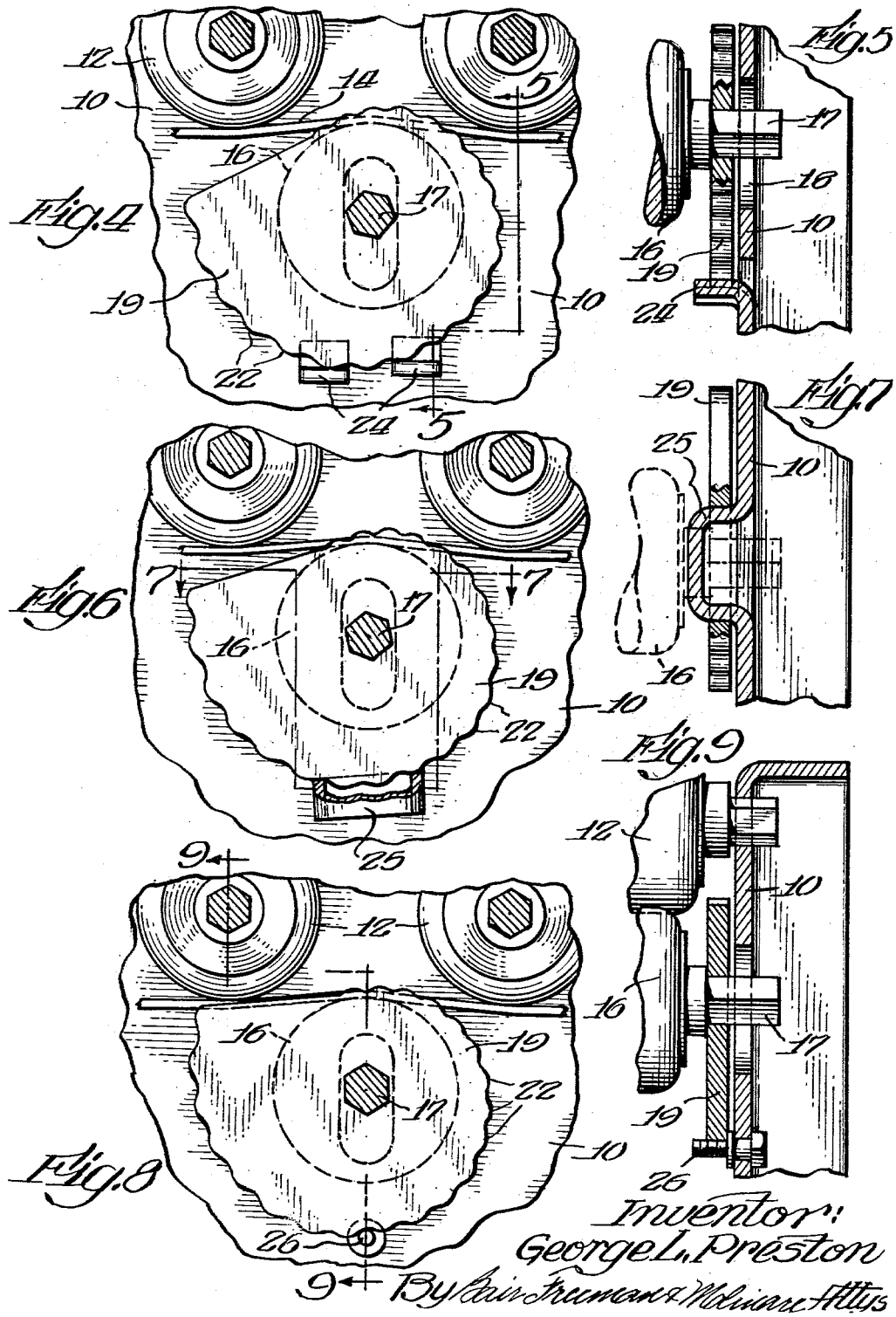

United States Patent Office 3,180,480
Patented Apr. 27, 1965

3,180,480
LIVE ROLLER CONVEYOR
George L. Preston, Itasca, Ill., assignor to Unarco Industries, Inc., Chicago, Ill., a corporation of Illinois
Filed July 29, 1963, Ser. No. 298,103
5 Claims. (Cl. 198—127)

This invention relates to live roller conveyors and more particularly to a conveyor in which the rollers are driven by engagement of an endless driving belt therewith.

In live roller conveyors, as heretofore constructed, it has been common practice to provide pressure rollers engaging the driving belt and pressing it into driving engagement with the conveyor rollers. The pressure rollers have normally been mounted for adjusting toward and away from the conveyor rollers by adjusting screws, or the like. In these constructions it is an extremely tedious operation to adjust the pressure rollers and is almost impossible to obtain uniform adjustment thereof to provide uniform driving pressure on the conveyor rollers.

It is accordingly an object of the present invention to provide a live roller conveyor in which the pressure rollers are easily and quickly adjustable and in which a high degree of uniformity of adjustment of the different pressure rollers can be obtained.

Another object is to provide a live roller conveyor in which the pressure rollers are supported at their ends by rotatable cams which are turned to different positions to adjust the pressure rollers.

According to a feature of the invention, the cams are formed on their peripheries with spaced projections engageable with abutments on the side rails of the conveyor frame to hold the cams against accidental movement and to provide adjustment steps to facilitate uniform setting of the different pressure rollers. The abutments may be in the form of single relatively thin lugs or projections which engage between the projections on the cams or may be spaced pieces which engage the cams at spaced points in their peripheries.

According to another feature of the invention, the cams are mounted on the ends of shafts on which the pressure rollers are freely rotatable so that by turning the shafts the cams at opposite ends thereof are adjusted simultaneously. Preferably the cams are slidable on the shafts and a spring is provided between at least one end of the pressure roller and the adjacent cam to hold the cams closely against the side rails of the conveyor frame.

The above and other objects and features of the invention will be more readily apparent from the following description when read in connection with the accompanying drawings, in which:

FIG. 1 is a partial side view of a live roller conveyor embodying the invention;

FIG. 2 is a section on the line 2—2 of FIG. 1;

FIG. 3 is a section on the line 3—3 of FIG. 2;

FIG. 4 is a view similar to FIG. 3 showing an alternative construction;

FIG. 5 is a section on the broken line 5—5 of FIG. 4;

FIG. 6 is a view similar to FIG. 3 showing still another alternative construction;

FIG. 7 is a section on the broken line 7—7 of FIG. 6;

FIG. 8 is a view similar to FIG. 3 of still another alternative construction; and FIG. 9 is a section on the broken line 9—9 of FIG. 8.

The conveyor, as shown, comprises a frame having side members 10 which, as illustrated, are generally channel shaped in cross section, although any other desired type of structure member could be employed. The side members are connected by spaced cross members 11 which hold the said members in parallel spaced relationship with each other to define a path along which material is to be moved.

The material to be moved, such as packages, boxes, or the like, is supported on a plurality of conveyor rollers 12 which extend between the side members 10 of the frame and are mounted for rotation on their own axes. As shown, each conveyor roller is journalled on a shaft 13 having non-circular end portions which fit into correspondingly shaped openings in the side members to support the conveyor rollers. The conveyor rollers may project above the tops of the frame side members, as shown, or could, if desired, terminate below the tops of the side members which could then function as guides to retain boxes or similar articles in the desired conveyor path.

The conveyor rollers 12 are driven by an endless belt 14. As shown in FIG. 1, the belt 14 passes over a guide roller 15 at one end of the conveyor and may pass over a similar guide roller at the opposite end of the conveyor, at least one of which is power driven. Suitable idler rollers, not shown, may be provided to guide the belt in its return run, as is conventional in the art.

The belt is held in driving engagement with the conveyor rollers 12 by a plurality of pressure rollers 16 which are rotatably mounted between and beneath adjacent pairs of conveyor rollers, as shown in FIG. 1. The pressure rollers 16 are journalled on shafts 17 which have non-circular end portions projecting through vertically elongated slots 18 in the side members of the conveyor frame. In this way, the shafts 17 are guided for vertical movement toward and away from the conveyor rollers. It will be apparent that when the shafts 17 are moved upward the pressure rollers will tension the belt between adjacent conveyor rollers and will press the belt firmly into engagement with the conveyor rollers so that they will be driven. Thus by adjusting the shafts 17 vertically the belt tension and contact with the conveyor rollers can be adjusted to determine the amount of driving force on the conveyor rollers.

For adjusting the shafts 17 in the slots 18 each of the non-circular ends of each shaft 17 fits through a complementary shaped opening in a spiral cam member 19. Each cam member 19 has a spirally shaped periphery so that as the shafts 17 are turned to turn the cam members with them the cam members will adjust the shaft vertically to adjust the pressure rollers. The shafts can easily be turned by fitting a wrench or other suitable special tool to either end thereof thereby simultaneously to turn both of the cams so that the ends of the shaft 17 will be moved through the same distance. Preferably a compression spring 21 is provided acting between one end of the pressure roller 16 and the adjacent cam member to hold both cam members in sliding engagement with the inner surface of the adjacent frame member 10 so that the cam members will properly engage abutments carried by the frame members, as described hereinafter.

According to an important feature of the invention, as best seen in FIG. 3, each of the cam members 19 is formed on its periphery with a series of spaced, smoothly rounded, projections 22 in the form of scallops. Due to this construction, the surfaces of the cam members will be held against accidental sliding on the abutments so that the desired adjustment will be maintained. Furthermore, the projections or scallops provide definite adjustment spaces which can be easily counted as the shafts are turned so that all of the shafts can be adjusted to the same position to provide the same driving engagement of the belt with each of the conveyor rollers.

As shown in FIGS. 1 to 3, the abutments which are engaged by the cam comprise tongues or lugs 23 which are cut from the side members 10 and pressed inwardly, as shown. As best seen in FIG. 3, each of the lugs 23 provides a relatihvely thin upper surface which will fit between adjacent projections 22 on the cam to hold the cam securely against accidental displacement once it is adjusted.

FIGS. 4 to 9 illustrate different forms of abutments which may be utilized, other parts therein corresponding to like parts in FIGS. 1 to 3 being indicated by the same reference numerals. As shown in FIGS. 4 and 5, the abutments are formed by a pair of tongues or lugs 24 pressed out from the adjacent side member 10 and defining relatively wide supporting surfaces which are spaced horizontally. The spacing between the lugs 24 is such that one of the projections 22 will lie between them with adjacent projections resting on the lugs, as seen in FIG. 4. This construction provides an adequate supporting surface for the cams while at the same time holding the cams against accidental turning and defining definite adjustment space therefor.

In FIGS. 6 and 7, the abutments are formed by slitting the side members 10 horizontally and pressing out the intermediate portion of the metal to define a U-shaped stirrup 25. The sides of the stirrup form spaced lugs which engage spaced points in the periphery of a cam with the intervening section of the cam extending downwardly into the stirrup between the sides thereof. Again this will provide adequate supporting surface for the cams and will lock the cams against accidental displacement while at the same time providing definite adjustment spaces which can easily be mounted as the cams are turned.

In FIGS. 8 and 9 the abutments are formed by pins 26 secured to the side members 10 and projecting inwardly therefrom. The pins may be conventional threaded bolts secured to the side members by nuts or the like and projecting inwardly therefrom to define an abutment. The pins are of a size to lie in the space between adjacent projections 22 on the cams so that they will hold the cams against accidental turning and will also provide definite adjustment spaces which can be counted as the shafts are turned.

While several embodiments of the invention have been shown and described herein, it will be understood that they are illustrative only and not to be taken as a definition of the scope of the invention, reference being had for this purpose to the appended claims.

What is claimed is:

1. A live roller conveyor comprising a frame including spaced side rails, a plurality of spaced parallel conveyor rollers journalled at their ends in the rails and substantially spanning the space between the rails, a driving belt underlying the conveyor rollers and adapted to engage and drive the conveyor rollers, a plurality of spaced parallel pressure rollers underlying the belt to press it into driving engagement with the conveyor rollers, a shaft on which each of the pressure rollers is rotatable and having its ends projecting through vertical slots in the rails, a cam secured to each end of each shaft, and abutments on the rails engaging the cams whereby as the shafts and cams are turned the pressure rollers will be adjusted toward and away from the conveyor rollers.

2. A live roller conveyor comprising a frame including spaced side rails, a plurality of spaced parallel conveyor rollers journaled at their ends in the rails and substantially spanning the space between the rails, a driving belt underlying the conveyor rollers and adapted to engage and drive the conveyor rollers, a plurality of spaced parallel pressure rollers underlying the belt to press it into driving engagement with the conveyor rollers, a shaft on which each of the pressure rollers is rotatable and having its ends projecting through vertical slots in the rails, a cam secured to each end of each shaft, the cams being formed on their peripheries with spaced projections, and abutments on the rails engaging the peripheries of the cams and interfitting with the projections to hold the cams against accidental turning.

3. The conveyor of claim 2 in which each of the abutments comprises an integral lug projecting from a rail and on which the cam rests.

4. The conveyor of claim 2 in which each of the abutments comprises a pair of horizontally spaced projections on the rail engaging the periphery of the cam at spaced points.

5. A live roller conveyor comprising a frame including spaced side rails, a plurality of spaced parallel conveyor rollers journalled at their ends in the rails and substantially spanning the space between the rails, a driving belt underlying the conveyor rollers and adapted to engage and drive the conveyor rollers, a plurality of spaced parallel pressure rollers underlying the belt to press it into driving engagement with the conveyor rollers, a shaft on which each of the pressure rollers is rotatable and having its ends projecting through vertical slots in the rails, cams fitting slidably but non-rotatably on the ends of the shafts adjacent to the rails, a spring acting between one end of the roller and the adjacent cam urging the cam toward the rail, and abutments on the rails on which the cams rest.

References Cited by the Examiner
UNITED STATES PATENTS

| 1,652,419 | 12/27 | Shields | 198—127 |
| 2,827,153 | 3/58 | Olk | 198—127 |

SAMUEL F. COLEMAN, *Primary Examiner.*

WILLIAM B. LA BORDE, *Examiner.*